United States Patent
Power et al.

(10) Patent No.: US 10,819,774 B2
(45) Date of Patent: *Oct. 27, 2020

(54) PREDICTIVE LOAD MITIGATION AND CONTROL IN A CONTENT DELIVERY NETWORK (CDN)

(71) Applicant: Level 3 Communications, LLC, Broomfield, CO (US)

(72) Inventors: William R. Power, Boulder, CO (US); Christopher Newton, Westlake Village, CA (US); Laurence Lipstone, Calabasas, CA (US); William Crowder, Camarillo, CA (US)

(73) Assignee: Level 3 Communications, LLC, Broomfield, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/724,809

(22) Filed: Dec. 23, 2019

(65) Prior Publication Data

US 2020/0128068 A1   Apr. 23, 2020

Related U.S. Application Data

(63) Continuation of application No. 15/727,682, filed on Oct. 9, 2017, now Pat. No. 10,523,744.

(51) Int. Cl.
*H04L 29/08*   (2006.01)

(52) U.S. Cl.
CPC ...... *H04L 67/1008* (2013.01); *H04L 67/1012* (2013.01); *H04L 67/1031* (2013.01); *H04L 67/14* (2013.01); *H04L 67/322* (2013.01)

(58) Field of Classification Search
CPC ............. H04L 67/1008; H04L 67/1012; H04L 67/1031; H04L 67/14; H04L 67/322
See application file for complete search history.

(56) References Cited

U.S. PATENT DOCUMENTS

| | | | |
|---|---|---|---|
| 8,521,880 B1* | 8/2013 | Richardson | G06F 15/17306 705/500 |
| 2007/0180116 A1* | 8/2007 | Kim | H04L 67/1008 709/226 |
| 2007/0250560 A1 | 10/2007 | Wein et al. | |
| 2008/0215735 A1 | 9/2008 | Farber et al. | |

(Continued)

OTHER PUBLICATIONS

International Preliminary Report on Patentability, dated Apr. 23, 2020, Int'l Appl. No. PCT/US18/033782, Int'l Filing Date May 22, 2018; 13 pgs.

(Continued)

*Primary Examiner* — Arvin Eskandarnia (57) ABSTRACT

A computer-implemented method, in a content delivery (CD) network that delivers content on behalf of multiple content providers. The method includes, at a server in the CDN, wherein the server is currently processing at least one other request in at least one other session: receiving a connection request from a client, the connection request being associated with a corresponding content request; determining whether handling the content request will cause the server to become overloaded; and, based on the determining in (B) and on information about the content request, conditionally (i) accepting the content request, and (ii) terminating or throttling at least one session on the server.

18 Claims, 5 Drawing Sheets

(56) References Cited

U.S. PATENT DOCUMENTS

| | | | |
|---|---|---|---|
| 2012/0124372 A1* | 5/2012 | Dilley | H04L 67/2819 |
| | | | 713/162 |
| 2012/0130871 A1 | 5/2012 | Weller et al. | |
| 2012/0179787 A1 | 7/2012 | Walsh | |
| 2012/0263036 A1 | 10/2012 | Barclay et al. | |
| 2014/0173079 A1 | 6/2014 | Newton et al. | |
| 2014/0297728 A1* | 10/2014 | Yanagawa | G06F 3/0611 |
| | | | 709/203 |
| 2014/0344399 A1* | 11/2014 | Lipstone | H04L 41/509 |
| | | | 709/217 |
| 2014/0372588 A1 | 12/2014 | Newton et al. | |
| 2015/0215334 A1 | 7/2015 | Bingham et al. | |
| 2016/0255171 A1 | 9/2016 | Salinger | |
| 2016/0286367 A1* | 9/2016 | Mashhadi | H04L 67/26 |
| 2019/0109895 A1 | 4/2019 | Power et al. | |

OTHER PUBLICATIONS

International Search Report and Written Opinion of the International Searching Authority, dated Aug. 3, 2018, Int'l Appl. No. PCT/US18/033782, Int'l Filing Date May 22, 2018; 14 pgs.

* cited by examiner

PREDICTIVE LOAD MITIGATION AND CONTROL IN A CONTENT DELIVERY NETWORK (CDN)

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

BACKGROUND OF THE INVENTION

Field of the Invention

This invention relates to content delivery and content delivery networks. More specifically, this invention relates to predictive load mitigation and control in content delivery networks (CDNs).

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Glossary

As used herein, unless used otherwise, the following terms or abbreviations have the following meanings:

CD means content delivery;
CDN or CD network means content delivery network;
DNS means domain name system;
IP means Internet Protocol;
QoS means quality of service; and
SSL means Secure Sockets Layer.

A "mechanism" refers to any device(s), process(es), routine(s), service(s), module(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

DESCRIPTION

A content delivery network (CDN) distributes content (e.g., resources) efficiently to clients on behalf of one or more content providers, preferably via a public Internet. Content providers provide their content (e.g., resources) via origin sources (origin servers or origins). A CDN can also provide an over-the-top transport mechanism for efficiently sending content in the reverse direction—from a client to an origin server. Both end-users (clients) and content providers benefit from using a CDN. Using a CDN, a content provider is able to take pressure off (and thereby reduce the load on) its own servers (e.g., its origin servers). Clients benefit by being able to obtain content with fewer delays.

A content provider that uses a CDN may be referred to as a CDN subscriber or customer.

Figure 1:
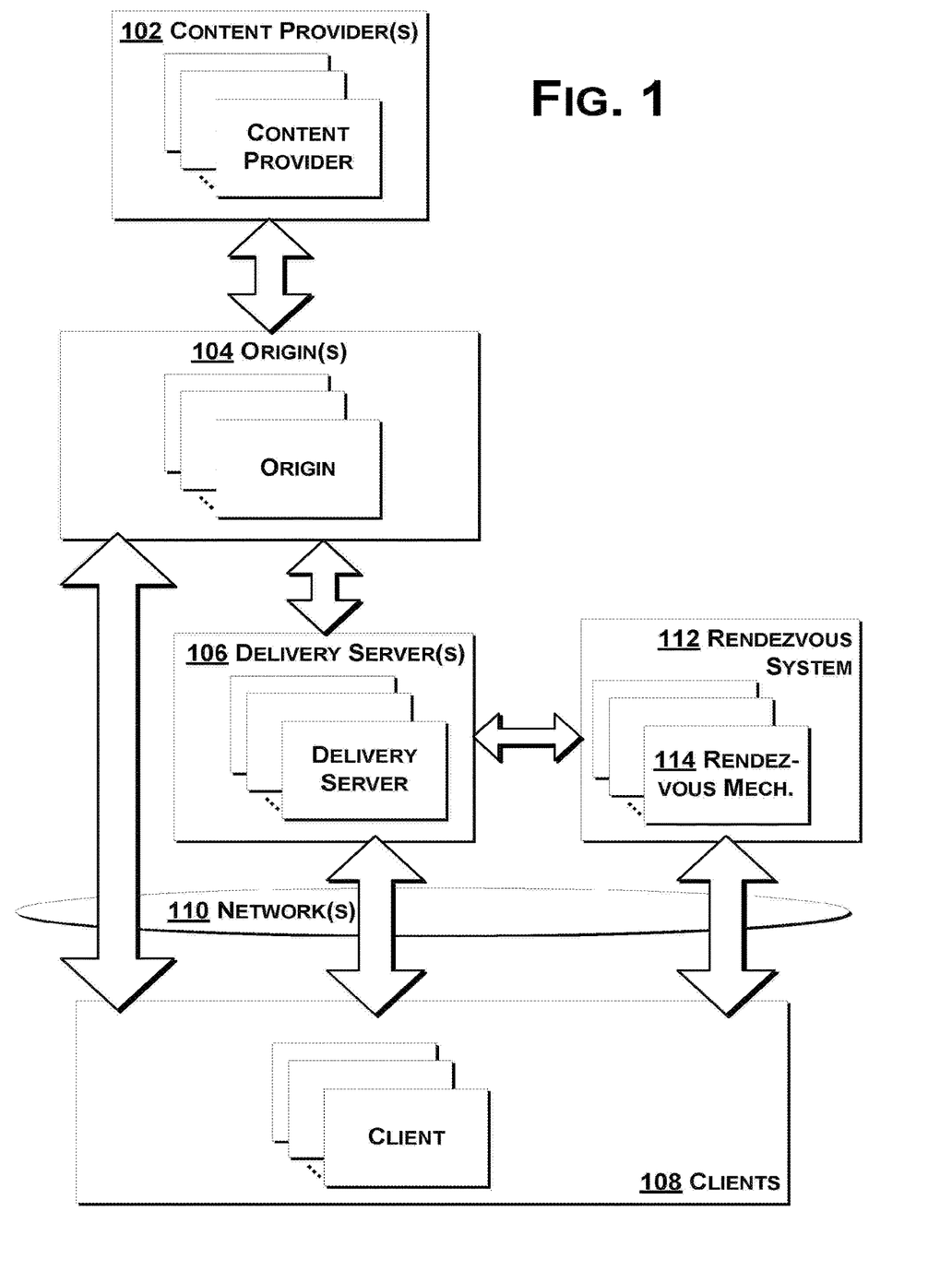
FIG. 1 depicts aspects of a content delivery network (CDN) according to exemplary embodiments hereof.

FIG. 1 shows aspects of an exemplary CDN in which one or more content providers (or subscribers) 102 provide content via one or more origin sources 104 and delivery services (servers) 106 to clients 108 via one or more networks 110. The delivery services (servers) 106 may form a delivery network from which clients 108 may obtain content. The delivery services 106 may be logically and/or physically organized hierarchically and may include edge caches.

A CDN provider typically maintains and operates content servers or server clusters (groups of multiple servers), e.g., delivery servers 106, at multiple locations in and around the CDN. The servers or server clusters may, e.g., be located at numerous different geographic regions (e.g., metropolitan areas) so that content can be stored proximate to users who request the content. As noted above, a CDN often includes servers at the so-called edge of the network (e.g., so-called "edge servers") and servers within the core of the network (e.g., so-called "origin servers"). Origin servers may store or retrieve content and furnish the content to the edge servers, which may in turn cache the content for later distribution. One or more intermediate tiers of servers may be used between the origin servers and the edge servers.

As should be appreciated, components of a CDN (e.g., delivery servers or the like) may use the CDN to deliver content to other CDN components. Thus a CDN component may itself be a client of the CDN. For example, the CDN may use its own infrastructure to deliver CDN content (e.g., CDN control and configuration information) to CDN components.

Content associated with or provided by a particular content provider or subscriber may be referred to as a property. A property may be, e.g., a website and related content, and typically comprises multiple resources. A CDN may provide one or more properties associated with and/or on behalf of one or more content providers. That is, a CDN may serve content on behalf of multiple subscribers, and each particular subscriber may have multiple resources or properties associated therewith that are to be served by the CDN. A content provider may have more than one property, and thus a CDN may serve/provide one or more properties associated with and/or on behalf of a particular content provider.

Exemplary CDNs are described in U.S. Pat. Nos. 8,060,613 and 8,825,830, the entire contents of both of which are fully incorporated herein by reference in their entirety and for all purposes.

With reference again to FIG. 1, client requests (e.g., for content) may be associated with delivery server(s) 106 by a rendezvous system 112 comprising one or more rendezvous mechanism(s) 114, e.g., in the form of one or more rendezvous networks. The rendezvous mechanism(s) 114 may be implemented, at least in part, using or as part of a DNS system, and the association of a particular client request (e.g., for content) with one or more delivery servers may be done as part of DNS processing associated with that particular client request (e.g., DNS processing of a domain name associated with the particular client request).

As should be appreciated, typically, multiple delivery servers 106 in the CDN can process or handle any particular client request for content (e.g., for one or more resources). Preferably the rendezvous system 112 associates a particular client request with one or more "best" or "optimal" (or "least worst") delivery servers 106 (or clusters) to deal with that particular request. The "best" or "optimal" delivery server(s) 106 (or cluster(s)) may be one(s) that is (are) close to the client (by some measure of network cost) and that is (are) not overloaded. Preferably the chosen delivery server(s) 106 (or cluster(s)) (i.e., the delivery server(s) or cluster(s) chosen by the rendezvous system 112 for a client request) can deliver the requested content to the client or can direct the client, somehow and in some manner, to somewhere where the client can try to obtain the requested content. A chosen delivery server 106 (or cluster) need not have the requested content at the time the request is made, even if that chosen delivery server 106 (or cluster) eventually serves the requested content to the requesting client.

Predictive Load Mitigation and Control

Each server in the CDN has a finite capacity that is a function of factors such as its hardware configuration (typically a static factor) and its current load (a dynamic factor). As used here, the term "load" means any use of the server (its hardware and/or its software). For example, load may refer, at least in part, to the number of open connections (incoming and outgoing) that the server is using.

Given that a goal of a CDN user (subscriber) is the efficient distribution of subscriber content to clients, it is generally desirable that a client request be handled by a CDN server that is not overloaded. To this end, the rendezvous system (112 in FIG. 1) selects an appropriate delivery server (106 in FIG. 1). In selecting a delivery server, the rendezvous system may use information about server loads and network traffic. The rendezvous system typically determines this information from data (e.g., tables) that are generated based on feedback from the delivery servers and on network measurements.

However, in some cases a client request may be directed (e.g., by the rendezvous system) to a server that is overloaded.

This may occur, e.g., because the server became overloaded after the most recent update of the load information used by the rendezvous system (so that the rendezvous system did not yet know of the server's overloaded state). This may also occur, e.g., when, despite its load, the server is still the "best" server to handle the request. Both of these situations may occur, e.g., when there is a sudden surge or demand (creating so-called "hot spots").

As used herein, a server is considered overloaded when some aspect of the server is used beyond its capacity to provide efficient service, causing the performance of the server to degrade below an acceptable level. For example, a server that has used all of its memory or ports (connections) or disk storage is overloaded.

In some cases, a particular client request may be directed to a server that is not yet overloaded, but handling that particular client request will cause it to become overloaded. In such cases, the rendezvous system made an appropriate decision, but if the server handles the request then its performance will degrade to an unacceptable level.

It is desirable, and an object hereof, to mitigate potential performance problems by preventing servers from becoming overloaded. Accordingly, when a CD server receives a client request, the CD server determines (or predicts) the effect of accepting the request. If the server predicts that accepting/handling the request will cause the server to become overloaded, then the server can either (i) accept the request and stop or degrade current processing of a different request; or (ii) reject the request.

Any finite resource(s) that a server has or provides (e.g., connections, disk capacity, CPU capacity, etc.) can be used to determine or predict whether that server is (or will become) overloaded.

The decision as to whether or not to accept a request from a client for a particular subscriber's resource(s) may be based on the effect that request will have on the server's resources and on service guarantees or arrangements (e.g., QoS arrangements) made with one or more subscribers.

In some cases, the CDN may reserve capacity for certain CDN subscribers. The CDN may reserve the capacity on a server by keeping a certain amount of the server's capacity in reserve in case needed. Alternatively, or in addition, the CDN may oversubscribe a server, without keeping sufficient reserve capacity. In such cases, if the server receives a request from a client for a particular subscriber's resource(s) and that subscriber has reserved capacity, some other request being handled by that server (i.e., some other session) will be terminated.

Preferably sessions are terminated gracefully, but a server may abruptly terminate any session in order to handle a new request and maintain a required QoS.

Example I

SSL (Secure Sockets Layer) connections have more computational resource costs than non-SSL connections. A server may reject or terminate SSL connections before non-SSL connections.

Example II

If a server is currently serving a large and a number of small libraries, the server may terminate the large library request while continuing to serve small libraries. This is especially beneficial if the small library is being served out of memory cache, whereas the large library will have to be fetched from elsewhere. Notably, since the small libraries are being served from memory cache, they do not require much disk usage (and so can discount or ignore disk usage or overload).

Example III

A server receives a request for a particular resource. Depending on the server's load (e.g., with respect to connections), the server determines if the requested resource is already in its cache. If so, the request is accepted, otherwise it is rejected.

Example IV

A server may consider the client's IP address in deciding whether or not to even accept a connection request. The server may consider previous activity associated with that client IP address and decide to reject or terminate a connection.

Figure 2A:
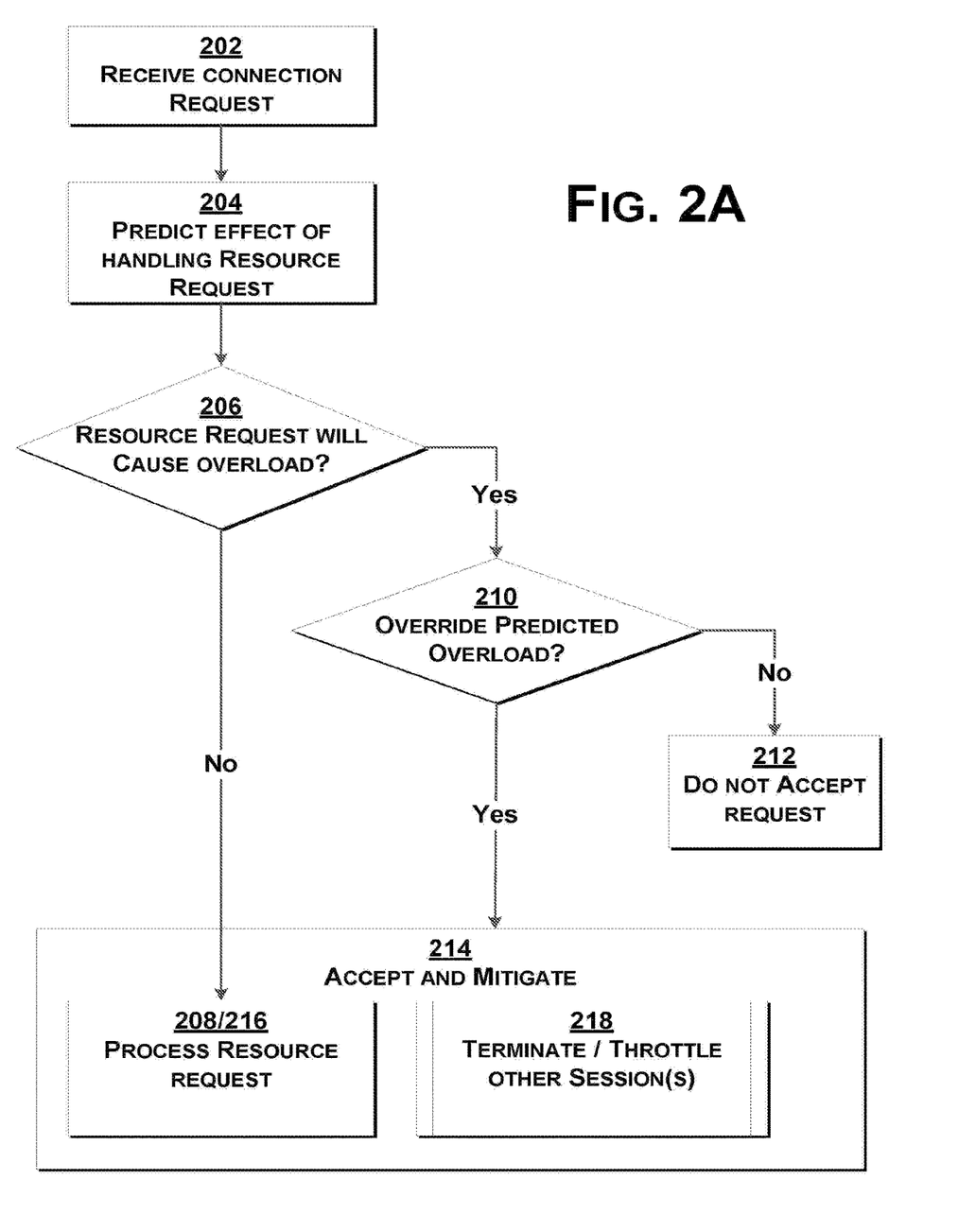
FIGS. 2A-2C are flowcharts showing aspects of the system according to exemplary embodiments hereof.
Figure 2B:
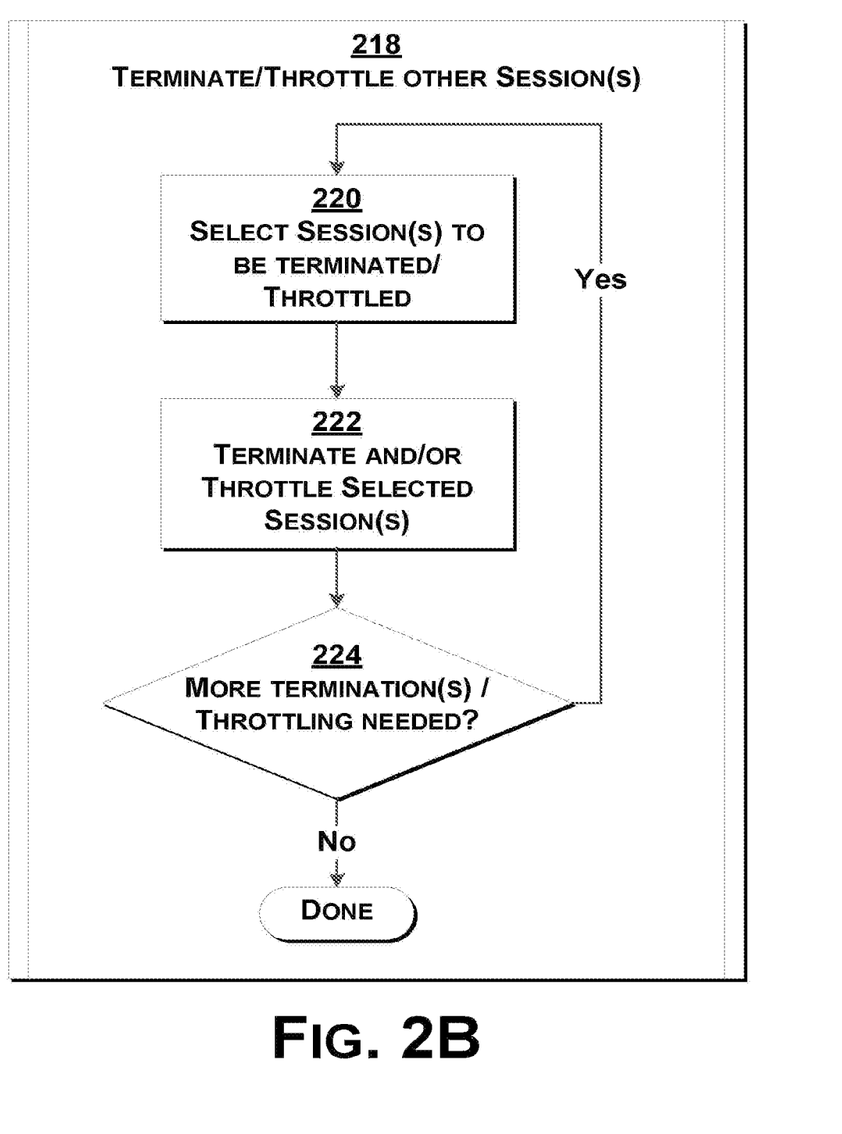
Figure 2C:
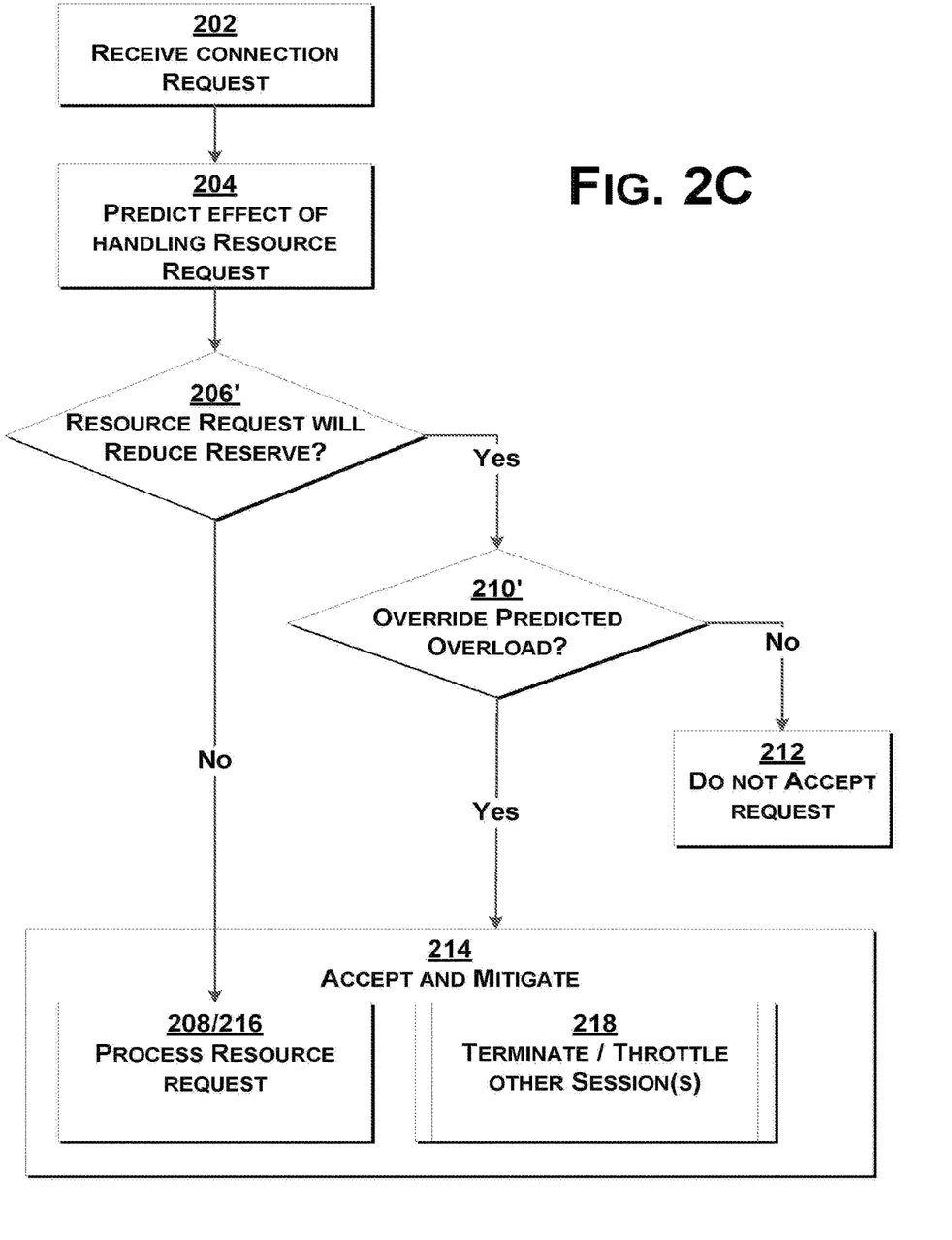

FIGS. 2A-2C are flowcharts showing aspects of the system according to exemplary embodiments hereof.

As shown in FIG. 2A, a CD server receives a connection request (at 202). The connection request is associated with a content/resource request. The CD server predicts the effect(s) of handling the content/resource request (at 204). The prediction may be based on one or more factors, including on any finite resource(s) that the server has or provides (e.g., connections, disk capacity, CPU capacity, etc.) and on the current usage of those resources.

In some embodiments the server maintains threshold values for each of a number of factors (e.g., connections, disk capacity, CPU capacity, etc.), and the prediction may be made based on current usage/capacity, expected usage if the content/resource request is handled, and the threshold values. The prediction may use a weighted function of various factors to determine or predict overload.

Note that the server generally needs to initially accept the connection request in order to make a prediction about handling the associated content/resource request. This is because, generally, the server cannot tell what kind of content/resource request it is getting until it sees the content/resource request. In some cases, however, a server may be able to determine enough information about a content/resource request without accepting the associated connection, e.g., based on an interface that the request came in on. However, in most cases the server will initially accept a connection request and make a prediction (at 204) based on information in the associated content/resource request. The information used to predict the effect of handling a content/resource request may be, e.g., based on the type or size of the requested resource and/or the subscriber whose resource is being requested, whether or not the requested resource is already in the server's cache, the effect of servicing the content request on other sessions currently being handled by the server, etc.

Based on the prediction (at 204), the server determines (at 206) whether accepting and handling the content/resource request (i.e., serving the requested resource) will overload the server. If it is determined (at 206) that accepting and handling the content/resource request will not overload the server, then the server accepts and processes the content/resource request (at 208). Otherwise, if it is determined (at 206) that accepting and handling the content/resource request will overload the server, then the server determines (at 210) whether the content/resource request (or the requested content/resource) is subject to overload overriding (e.g., is associated with a QoS guarantee). A resource (or the content/resources of a particular CDN subscriber) may be given a QoS guarantee, in which case the fact that the server predicts an overload (at 204, 206) may be overridden (at 210).

If the request is not subject to overload override (e.g., no QoS guarantee is associated with the requested resource) (as determined at 210), then the content/resource request is not accepted (at 212). As should be appreciated, to reach this point, the server has predicted (at 204, 206) that accepting the resource request will overload the server, and the requested resource is not subject to any overload overriding or special handling (at 210). If the resource request is not accepted (at 212), then its associated connections (if any) should be terminated.

If the server predicts that accepting the resource request will overload the server (at 204, 206), and the request (or requested resource) is subject to overload override (at 210), then (at 214) the server handles the resource request (at 216) and tries to mitigate the overload by terminating or throttling down one or more other sessions (at 218). The two processes 216 and 218 in box 214 in the flowchart in FIG. 2A may occur in any order, including sequentially and/or in parallel.

With reference to FIG. 2B, the process of terminating (or throttling) at least one other session (at 218) includes selecting one or more sessions to be terminated/throttled (at 220), terminating or throttling the selected sessions (at 222), and then determining (at 224) if more connections need be terminated/throttled in order to sufficiently reduce the load (or overload) on the server. If it is determined that more connections need to be terminated/throttled, the process of selecting and terminating or throttling (at 220 and 222) is repeated.

The goal of the termination/throttling is to reduce the load on the server. This goal will be achieved by termination of one or more sessions, but may also be sufficiently achieved by throttling one or more sessions down in order to reduce the load they are causing on the server. The decision as to whether or not to terminate versus throttle a session may be based on a policy (e.g., set by the CDN operator or the subscriber). As those of ordinary skill in the art will realize and appreciate, upon reading this description, the decision as to whether to terminate or throttle a session may also be driven by each load metric that is in overload. For example, if a limiting factor is the number of connections being handled, then throttling some existing connections will not help. However, if the issue is bandwidth (e.g., upstream, downstream or mass storage) then throttling some connections may be a reasonable step.

In some embodiments, subscribers may agree to allow reduced QoS for some or all of their resources. In those cases, those sessions that are serving those resources may be terminated or throttled ahead of other sessions.

As noted above, in some cases, the CDN may reserve capacity for certain CDN subscribers. With reference to FIG. 2C, the prediction and associated test for overload (at 204, 206 in FIG. 2A) may, instead, be a test of whether the resource/content request will cause too much reduction in the server's reserved capacity (at 204, 206' in FIG. 2C). The override test (at 210 in FIG. 2A) may be a test for whether the subscriber associated with the requested content/resource is entitled to use the reserve capacity.

Those of ordinary skill in the art will appreciate and understand, upon reading this description, that the systems, methods and devices disclosed herein support graceful degradation of oversubscribed servers in a CDN.

Throttling Decisions and Implementations

In some embodiments, a scoring system may be used to pick candidates to determine which existing connections to terminate or throttle. For example, in some cases, if a new request is received and two clients are currently downloading a resource (the same resource, for the sake of simplicity) belonging to a publisher with a lower QoS setting than the new request, then the existing client that has longer to go on their request should be terminated first. This decision is based on the notion that the CDN has already invested a certain amount of resources for the other client, so it may be better to allow that one to proceed to completion if possible.

It is generally better to terminate connections that have the least value to the cache, e.g., first order sorting by QoS level, then amount of resources being consumed by them, and then the expected remaining amount of such. For example, if the limiting factor is bandwidth and there is a long-running slow connection on a low QoS property and a fast connection for that same property (or at least, a property of the same QoS level), a policy may indicate that it is better to eject the fast connection since that will reduce the amount of consumed bandwidth by the largest amount. Conversely, if the limiting factor is the number of connections, then dumping the slow connection would be better because it will hold its connection(s) open the longest (i.e., the highest total resource consumption over the lifetime of that connection).

Throttling preferably involves not considering a connection to be serviceable when it otherwise is for some increasing percentage of time. For example, in the normal case, when a socket to the client becomes writable, the CD service will put content for it into the socket buffer. If the CD service is able to do that faster than the socket buffer is drained (e.g., because of a slow client or connection), then the socket will periodically become unready and the CD service will just not service that socket each processing iteration until it becomes ready again In general, throttling may be achieved by servicing a connection m out of n iterations, where m<n. Thus, for a connection being throttled, the CD service may ignore the ready status on that connection for some number or ratio of iterations (e.g., service the connection 1:2 or 2:3 iterations, etc.)

The throttling amount or ratio may be adjustable. For example, when a CD service gets into the state of needing to throttle, it could do so at a low level (e.g., it will allow connections to be serviced when ready nine times out of ten). However, if the degree of new demand continues to increase then the rate of throttling will need to be increased (e.g., going from ignoring a connection 1:10 iterations, to 1:9, then 1:8 etc., until it starts ignoring 4 times out of 5, then 5 times out of 6 and so on).

At some point the client may abandon the connection when it is sufficiently throttled. In addition, in some embodiments, the system may have a cut-off, after which the connection may as well be dropped. For example, when ignoring a client 9 times out of 10, the system may as well just drop it completely.

Computing

The services, mechanisms, operations and acts shown and described above are implemented, at least in part, by software running on one or more computers of a CDN.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 3:
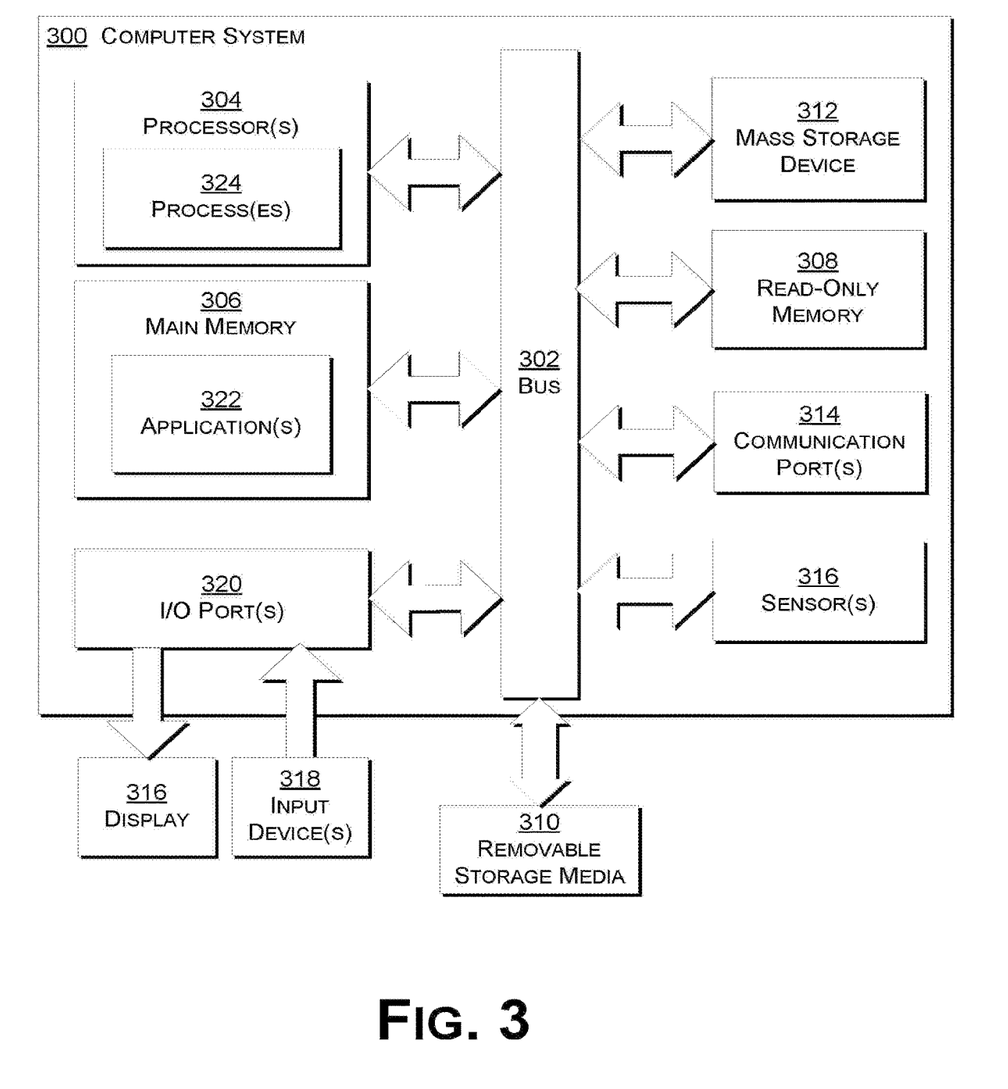
FIG. 3 depicts aspects of computing according to exemplary embodiments hereof.

FIG. 3 is a schematic diagram of a computer system 300 upon which embodiments of the present disclosure may be implemented and carried out.

According to the present example, the computer system 300 includes a bus 302 (i.e., interconnect), one or more processors 304, a main memory 306, read-only memory 308, removable storage media 310, mass storage 312, and one or more communications ports 314. Communication port 314 may be connected to one or more networks by way of which the computer system 300 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 304 can be any known processor, such as, but not limited to, an Intel® Itanium® or Itanium 2® processor(s), AMD® Opteron® or Athlon MP® processor(s), or Motorola® lines of processors, and the like. Communications port(s) 314 can be any of an RS-232 port for use with a modem based dial-up connection, a 10/100 Ethernet port, a Gigabit port using copper or fiber, or a USB port, and the like. Communications port(s) 314 may be chosen depending on a network such as a Local Area Network (LAN), a Wide Area Network (WAN), a CDN, or any network to which the computer system 300 connects. The computer system 300 may be in communication with peripheral devices (e.g., display screen 316, input device(s) 318) via Input/Output (I/O) port 320.

Main memory 306 can be Random Access Memory (RAM), or any other dynamic storage device(s) commonly known in the art. Read-only memory 308 can be any static storage device(s) such as Programmable Read-Only Memory (PROM) chips for storing static information such as instructions for processor 304. Mass storage 312 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 302 communicatively couples processor(s) 304 with the other memory, storage, and communications blocks. Bus 302 can be a PCI/PCI-X, SCSI, a Universal Serial Bus (USB) based system bus (or other) depending on the storage devices used, and the like. Removable storage media 310 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 306 is encoded with application(s) 322 that supports the functionality discussed herein (the application 322 may be an application that provides some or all of the functionality of the CD services described herein, including rendezvous services). Application(s) 322 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 304 accesses main memory 306 via the use of bus 302 in order to launch, run, execute, interpret or otherwise perform the logic instructions of the application(s) 322. Execution of application(s) 322 produces processing functionality of the service related to the application(s). In other words, the process(es) 324 represent one or more portions of the application(s) 322 performing within or upon the processor(s) 304 in the computer system 300.

It should be noted that, in addition to the process(es) 324 that carries (carry) out operations as discussed herein, other embodiments herein include the application 322 itself (i.e., the un-executed or non-performing logic instructions and/or data). The application 322 may be stored on a computer readable medium (e.g., a repository) such as a disk or in an optical medium. According to other embodiments, the application 322 can also be stored in a memory type system such as in firmware, read only memory (ROM), or, as in this example, as executable code within the main memory 306 (e.g., within Random Access Memory or RAM). For example, application 322 may also be stored in removable storage media 310, read-only memory 308 and/or mass storage device 312.

Those skilled in the art will understand that the computer system 300 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the term "content" means, without limitation, any kind of data, in any form, regardless of its representation and regardless of what it represents. Content may include, without limitation, static and/or dynamic images, text, audio content, including streamed audio, video content, including streamed video, web pages, computer programs, documents, files, and the like. Some content may be embedded in other content, e.g., using markup languages such as hypertext markup language (HTML) and extensible markup language (XML). Content includes content that is created or formed or composed specifically in response to a particular request. The term "resource" is sometimes used herein to refer to content.

As used herein, including in the claims, the phrase "at least some" means "one or more," and includes the case of only one. Thus, e.g., the phrase "at least some services" means "one or more services", and includes the case of one service.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of CDN services" may include one or more CDN services.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A computer-implemented method, in a content delivery (CD) network, wherein said CD network (CDN) delivers content on behalf of multiple content providers, the method comprising,
    at a server in said CDN,
    wherein said server is processing at least one other request in at least one other session:
    (A) receiving a content request;
    (B) determining whether handling said content request will cause said server to become overloaded based on a predicted effect of the sever processing the content quest; and
    (C) based on said determining in (B), based on whether a predicted overload is subject to override, and based on information about said content request, terminating or throttling at least one session on said server.

2. The method of claim 1 further comprising:
    (A)(2) accepting said connection request prior to said determining in (B).

3. The method of claim 1 wherein (C) further includes conditionally accepting said content request.

4. The method of claim 1 wherein the determining in (B) is based on at least one measure of then-current load or capacity of the server.

5. The method of claim 4 wherein the at least one measure of load or capacity of the server comprises a measure of one or more of:
    processor load; open ports; open connections; bandwidth; and disk usage.

6. The method of claim 1 wherein said content request is accepted even if it is determined, in (B), that handing said content request will cause said server to become overloaded.

7. The method of claim 6, wherein the content request is for content associated with a particular provider and wherein said content request is accepted based on a service arrangement with said particular provider.

8. The method of claim 7 wherein the service arrangement comprises a quality of service guarantee.

9. The method of claim 6 wherein said content request is accepted based on a size of the requested content.

10. The method of claim 1 wherein whether said predicted overload is subject to override is based on said information about said content request.

11. The method of claim 1 wherein said information about said content request used in (C) comprises a network address associated with said content request.

12. The method of claim 11 wherein accepting said content request in (C) is based on prior activity associated with said network address.

13. The method of claim 1 wherein accepting said content request in (C) is based on capacity on one or more other servers in the CDN.

14. The method of claim 1 wherein throttling said at least one session on said server comprises reducing one or more resources allocated to said at least one session.

15. The method of claim 14 wherein said reducing one or more resources allocated to said at least one session comprises:
    reducing an amount of said one or more resources allocated per time period.

16. The method of claim 14 comprising terminating said at least one session when said one or more resources are reduced below a certain level.

17. An article of manufacture comprising a computer-readable medium having program instructions stored thereon, the program instructions, operable on a computer system in a content delivery network (CDN), said device implementing at least one content delivery (CD) service, wherein execution of the program instructions by one or more processors of said computer system causes the one or more processors to carry out the acts of:
    at a server in said CDN, wherein said server is processing at least one other request in at least one other session:
    (A) receiving a content request;
    (B) determining whether handling said content request will cause said server to become overloaded; and
    (C) based on said determining in (B), based on whether a predicted overload is subject to override, and based on information about said content request, terminating or throttling at least one session on said server.

18. A device in a content delivery network (CDN), wherein said CDN delivers content on behalf of at least one content provider, said device implementing a content delivery (CD) service, the device:
    wherein said device is processing at least one other request in at least one other session:
    (A) receiving a content request;
    (B) determining whether handling said content request will cause said server to become overloaded; and
    (C) based on said determining in (B), based on whether a predicted overload is subject to override, and based on information about said content request, terminating or throttling at least one session on said device.

* * * * *